…

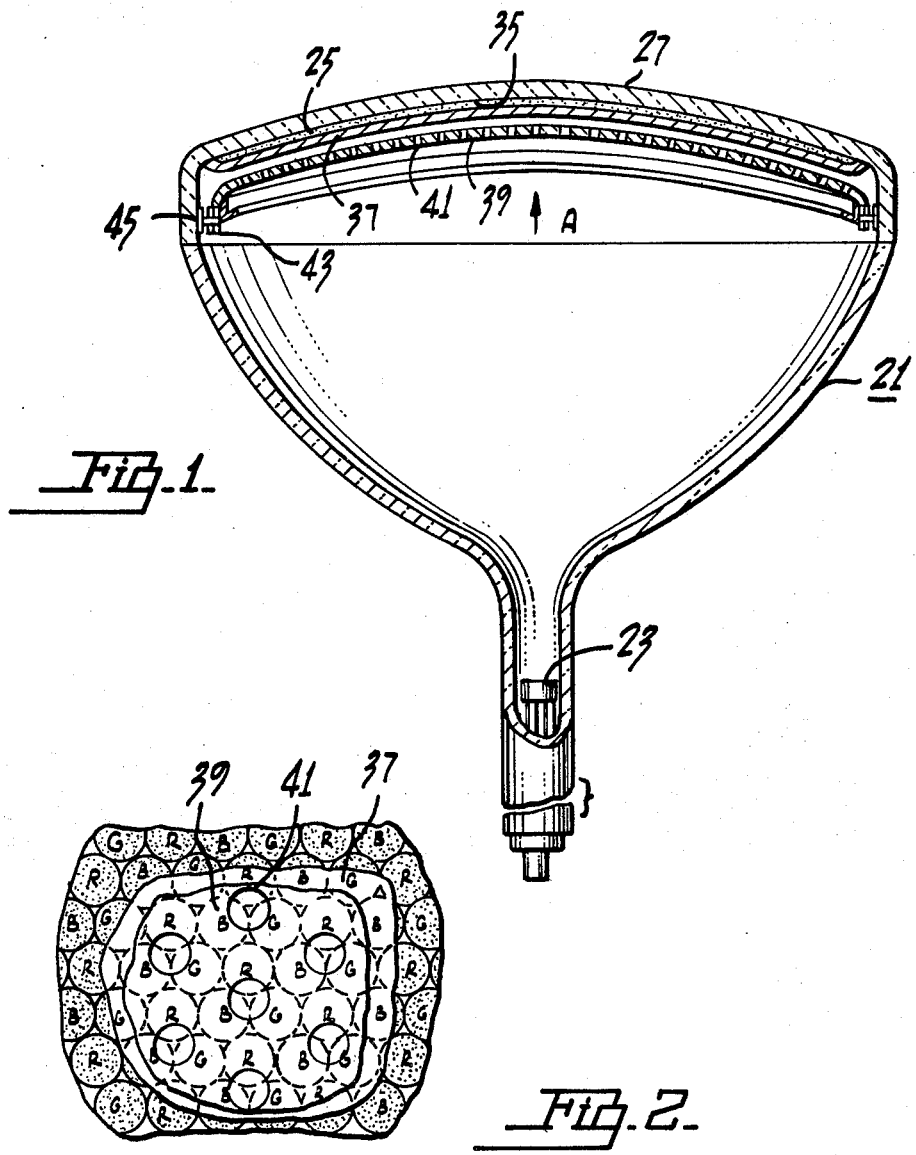

United States Patent Office 3,497,749
Patented Feb. 24, 1970

3,497,749
COLOR DISPLAY TUBE WHOSE BLUE EMITTER IS A SILVER-ACTIVATED ZINC SULPHIDE CONTAINING ONLY ONE OF MAGNESIUM, CALCIUM, STRONTIUM AND BARIUM
Franklin G. Bushey, Leesburg, Ind., assignor to RCA Corporation, a corporation of Delaware
Filed Nov. 28, 1966, Ser. No. 597,357
Int. Cl. H01j 29/18
U.S. Cl. 313—92     5 Claims

ABSTRACT OF THE DISCLOSURE

A color picture display, typically a cathode ray tube for color television, having luminescent means therein comprised of a blue-emitting phosphor, a green-emitting phosphor and a red-emitting phosphor. The blue-emitting phosphor of the display is a silver-activated zinc sulfide containing only one of magnesium, calcium, strontium, and barium, and is substantially free of monovalent cations other than silver cations. This blue-emitting phosphor is more resistant to copper contamination during fabrication of the screen and the emission color is more stable over the normal operating range of excitation than previously used blue-emitting phosphors.

BACKGROUND OF THE INVENTION

Commercial picture tubes for color television, or color kinescopes as they are sometimes called, are cathode ray tubes which include a viewing screen comprised generally of a multiplicity of red-emitting, green-emitting and blue-emitting phosphor elements. These elements are usually arranged on the inner surface of the faceplate of the picture tube in a regular cyclic array and are excited to emission with one or more electron beams which scan the viewing screen. In the shadow mask type picture tube, the phosphor elements are usually dots arranged in groups of threes or triads, each triad having a red-emitting dot, a green-emitting dot, and a blue-emitting dot. There are about 300,000 of such triads in a commercial 21 inch shadow mask kinescope. There are, of course, other geometrical arrangements and shapes of phosphor elements for other cathode tube types.

While the prior art teaches that any blue-emitting phosphor can be used in the blue-emitting dot (see, for example, 3,243,625 to A. K. Levine et al.), the blue-emitting phosphor used in commercial color picture tubes is, and has been, a zinc sulfide activated with silver which is synthesized in the presence of one or more alkali halides, or combinations of alkaline earth halides, or combinations of alkali and alkaline earth halides (see, for example, 3,052,638 to R. E. Wayrynen). Such previously-used blue-emitting phosphors, while suitable for color kinescopes in many respects, (1) have poor resistance to copper contamination during manufacturing of the viewing screen and (2) the light output from the phosphor shifts toward longer wavelengths at higher levels of excitation in the normal operating range.

Copper contamination of the blue-emitting phosphor is a phenomenon observed especially in the manufacture of picture tubes for color television, wherein the partially-fabricated screens are open and poorly shielded from dust and other ambient conditions in the factory. While the screen is in this open condition, microscopic particles containing copper occasionally settle on one or more of the blue-emitting phosphor elements of the luminescent screen. Then, subsequently, during baking out of the screen, the copper becomes incorporated in the phosphor and shifts the emission of the blue-emitting element toward green. When this change of emission color of blue-emitting elements in the screen is apparent to the viewer, the screen is rejected at the factory.

A shift in color of the luminescence emission from the blue-emitting elements with increased electron beam current has the effect of changing the color of the images displayed on the screen. Thus, with prior screens, as the brightness of an incremental area increases, particularly where a white field is displayed, the viewed color shifts away from blue and toward the red or the green. This occurs because the area becomes deficient in blue with respect to the amount of red and green emission.

SUMMARY OF THE INVENTION

The novel color picture display device includes a luminescent means comprised of a blue-emitting phosphor, a green-emitting phosphor and a red-emitting phosphor, and means for selectively exciting each of the phosphors with electrons. The composition of the blue-emitting phosphor may be represented by the molar formula:

$$ZnS:Ag(x):M(y)$$

wherein:

M is the only one of Mg, Ca, Sr, and Ba,
$x$ is in the range of 0.015 to 0.60 weight percent,
$y$ is in the range of 0.02 to 2.00 weight percent,
the blue-emitting phosphor being substantially free of monovalent cations other than silver cations.

It has been found, surprisingly, that the novel screen is improved over prior screens both as to cost of manufacture and in performance through the use of the particular blue-emitting phosphor. This blue-emitting phosphor is substantially more resistant to copper contamination during tube fabrication, thereby producing fewer rejected screens. Additionally, the color of the light output from the blue-emitting phosphor elements is substantially constant over the normal range of electron beam current used to excite the elements, thereby providing a device which is capable of improved performance over similar prior devices.

BRIEF DESCRIPTION OF THE DRAWING

FIGURE 1 is a sectional view of a three-gun tri-color cathode ray tube of the shadow mask dot screen variety.
FIGURE 2 is a fragmentary plan view of the screen structure of the tube of FIGURE 1, viewed in the direciton of the arrow A, showing a conventional hexagonal pattern of mask apertures and color dots.

DESCRIPTION OF THE PREFERRED EMBODIMENT

The novel luminescent means may be embodied in any of the three-color viewing screens used in any of the known color kinescope types. Thus, for example, the novel combinations may be embodied in kinescopes of the focus mask type, the focus grill type, the penetration type, the projection type, the line screen sensing type, and the shadow mask type including both the single gun and multiple gun types. Since combinations of three phosphors for color television are designated as P-22 screens in the art, the combinations of phosphors disclosed herein may also be so designated. The screens may be constituted of phosphor elements such as layers, lines or dots and may include elements which are white-emitting.

The novel cathode ray tubes and luminescent screens may be fabricated by any of the known processes for this purpose. The phosphor elements may be produced, for example, by silk-screening or photographic deposition. In using photographic deposition, the phosphor particles may be included in a photoresist composition. The phosphor-photoresist composition is sprayed or slurried or otherwise coated upon the inner surface of the faceplate of a cathode ray tube or other support, the coating dried, the dry coating exposed to a pattern of light, and then the exposed coating developed. Alternatively, the photoresist composition (without phosphor) may be sprayed, slurried or otherwise coated on the support, the coating dried, the dry coating exposed to a pattern of light and then the exposed coating developed. The phosphor may be applied, as by settling or dusting, to the coating either before exposure, between exposure and development, or after development. After the phosphor elements have been deposited, the screen is filmed and aluminized in the usual way. The screen is then baked-out and assembled with electron guns and the masks, grills and electrodes, as required, in an envelope, usually of glass. The assembled tube is baked-out, evacuated, and sealed. In some processes, the bake-out step after aluminizing is omitted.

A preferred embodiment of the invention illustrated in FIGURES 1 and 2 is for a conventional shadow mask type of kinescope structure which is comprised of a glass envelope 21 having three electron guns 23 at one end thereof adapted to project three electron beams at a target structure at the opposite end of the envelope 21. The target structure includes a luminescent viewing screen 25 supported on a glass faceplate 27, which faceplate is part of the envelope 21. The screen 25 is comprised of a multiplicity of red-emitting, green-emitting and blue-emitting phosphor dots R, B, and G respectively, adhered to the inner surface 35 of the faceplate 27. The dots are arranged in a regular repetitive order of triads of three dots, one dot being of each color emission characteristic. The dot structure is overlaid with a reflective coating 37 of aluminum. Closely spaced from the faceplate 27 toward the guns 23 is a metal shadow mask 39 having a multiplicity of apertures 41 therein, one aperture for each triad. The mask is supported on studs 45 attached to the envelope 21 by four springs 43 attached to the mask 39. The shadow mask 39 is so positioned between the guns 23 and faceplate 27 that, during operation, an electron beamlet from each of the three beams passes through each aperture of the shadow mask 39 at a slightly different angle and excites a different one of the three dots of a triad. Thus, the electron beam from the first gun can excite all of the red-emitting dots, the electron beam from the second gun can excite all of the green-emitting dots, and the electron beam from the third gun can excite all of the blue-emitting dots. Herein, the currents of these beams may be referred to as the red beam current, the green beam current, and the blue beam current, respectively. The total beam current is the sum of the red, the green, and the blue beam currents.

The green-emitting phosphor elements preferably consist essentially of zinc cadmium sulfide with about 0.008 weight percent silver activator and a weight ratio of ZnS/CdS of about 60/40. The molar formula of this phosphor is approximately 0.69 ZnS·0.31CdS:Ag(0.008). The activator content of this phosphor may be in the range of 0.0005 to 0.100 weight percent of the phosphor. The weight ratio of SnS/CdS of suitable green-emitting zinc cadmium sulfides may be in the range of 55/45 to 70/30. Other green-emitting phosphors with characteristics which are essentially the same as those of the foregoing green-emitting phosphors may be used. Phosphor elements made of such green-emitting phosphors have a luminous efficiency in the range of 20 to 100 lumens/watt and a persistence in the range of 10 to 1000 microseconds.

The red-emitting phosphor elements preferably consist essentially of yttrium oxysulfide with about 3.0 mol percent europium. This phosphor may be represented by the molar formula $Y_{1.94}Eu_{0.06}O_2S$, since the europium content is 3 mol percent of the content of yttrium plus europium. The activator, i.e., Eu, content of this phosphor may be in the range of 2.5 to 5.5 mol percent of the content of yttrium plus europium. At 2.5 to 3.0 mol percent europium, the phosphor is brighter and is slightly less red; whereas at 5.0 to 5.5 mol percent, the phosphor is redder but slightly less bright. With about 5.0 mol percent europium, the CIE coordinates of the phosphor elements are about $x=0.675$ and $y=0.325$. With about 3.0 mol percent europium, the CIE coordinates of the phosphor elements are about $x=0.663$ and $y=0.337$.

Another suitable red-emitter is yttrium orthovanadate with about 5.0 mol percent europium. This phosphor may be represented by the molar formula $Y_{0.95}Eu_{0.05}VO_4$. The CIE coordinates of phosphor elements made of this phosphor are about $x=0.675$ and $y=0.325$. The activator content may be in the range of 2.5 to 5.5 mol percent. With lower europium activator content, the emission is brighter and slightly less red.

Still another useful red-emitting phosphor is a zinc cadmium sulfide with about 0.002 weight percent silver activator, which may be represented by the molar formula 0.24ZnS·0.76CdS:Ag(0.002), in which the weight ratio of ZnS/CdS is about 17.5/82.5. The CIE coordinates of phosphor elements made of this phosphor are about $x=0.663$ and $y=0.337$. Other useful red-emitting zinc cadmium sulfides may have a weight ratio of ZnS/CdS in the range of about 15/85 to 20/80 and a silver content in the range of about 0.0005 to 0.010 weight percent.

Generally, phosphor elements made of the red-emitting phosphor have a luminous efficiency in the range of about 5 to 15 lumens/watt and a persistance in the range of about 10 to 1000 microseconds. The CIE color coordinates are in the ranges of about $x=0.610$ to $0.680$ and $y=0.320$ to $0.350$. Under typical operating conditions, values are about $x=0.635$ and $y=0.340$.

The blue-emitting elements consist essentially of a silver-activated zinc sulfide phosphor whose composition may be represented by the molar formula:

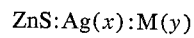

$$ZnS:Ag(x):M(y)$$

wherein:
M is only one of Mg, Ca, Sr and Ba,
x is in the range of 0.015 to 0.060 weight percent,
y is in the range of 0.02 to 2.00 weight percent.

In the preferred form, M is Mg, x is about 0.030 and y is about 0.35. Generally, the blue-emitting elements having luminous efficiency in the range of 3 to 15 lumens/watt and a persistence in the range of 10 to 1000 microseconds. The CIE color coordinates of the blue-emitting elements are in the range of about $x=0.140$ to $0.160$ and $y=0.050$ to $0.100$.

The blue-emitting phosphor may be prepared by heating at about 900 to 1100° C., a mixture of zinc sulfide, a silver compound, and a flux. A process for preparing the blue-emitting phosphor used in this invention may be that described in U.S. Patent 2,956,028 to J. A. Davis except in the following three respects. First, only zinc sulfide may be used as the host material. Second, only silver may be used as the activator. Third, the flux is substantially free of monovalent cations and contains a compound or compounds of only one alkaline earth cation.

Experimental data indicates that when monovalent cations (including ammonium) are present in the flux during synthesis of the phosphor, (a) some of these monovalent cations are incorporated in the phosphor, (b) less silver is actually incorporated in the phosphor, (c) the phosphor has less resistance to copper contamination than phosphors made with fluxes that are free of monovalent cations, and (d) the emission from the phosphor shifts toward longer wavelengths at higher levels of excitation.

Experimental data also indicates that when there are combinations of two or more alkaline earth cations present in the flux during synthesis of the phosphor, the visual brightness from the phosphor is lower and the persistance of the light output from the phospor is longer than for phosphors made with fluxes containing only a single alkaline earth cation.

A blue-emitting phosphor containing about 0.030 weight percent silver and about 0.32 weight percent magnesium may be prepared by the following recipe, although other recipes and processes may be used. In a stir tank, make a slurry of 200 pounds of zinc sulfide with water. While stirring, add 0.030 weight percent silver, an aqueous silver nitrate solution. Continue stirring and add to the slurry 4 pounds of magnesium chloride $MgCl_2$ as an aqueous solution. Dry the combined slurry and solution at about 175° C. Tumble the dried mixture with about 4 lbs. of powdered sulfur. Pack the tumbled mixture in silica crucibles. The crucibles are covered and then fired at about 980° C. for about three hours and then cooled to room temperature to produce the phosphor. The contents of the crucibles are examined under 3550 A. ultraviolet light and dead or discolored material is discarded. About 200 lbs. of the fired material are then dispersed in about 80 gallons of water. Then, with stirring, add to this dispersion 2800 ml. of a 10% potassium silicate solution and 4600 ml. of a zinc sulfate solution having a specific gravity of 1.056. These latter steps apply a silicate coating to the phosphor particles. Following this, the coated phosphor is washed by decantation, dried, and sieved.

It is not surprising that blue-emitting zinc sulfide phosphors can be made using a flux containing only one alkaline earth cation and free of monovalent cations. What is surprising is that these phosphors are capable of providing improved picture tubes for color television through two features not previously appreciated.

One feature of the blue-emitting phosphor is its unusually high resistance to copper contamination. One laboratory method for determining the degree of copper contamination resistance is as follows. Two 10 gram samples of the phosphor to be tested are weighed into separate 30 ml. beakers. A solution of the metal impurity is added to one beaker, and an equal amount demineralized water is added to the other, which is used as a control. For the copper contamination test, 20 parts per million of copper, based on the weight of the phosphor, is used to determine the degree of contamination resistance of the phosphor. This requires 10 ml. of a copper salt solution containing 20.0 micrograms of copper per ml. of solution. The phosphor slurries are mixed and then dried at about 125° C. The dried materials are stirred and mixed with a glass rod. The beakers are covered and baked at 425° C. (in and out of the oven at temperature) for one hour. The baked phosphors are sifted through a 200 mesh sieve and settled through an aqueous medium on 2 inch x 2 inch glass plates to form a screen having a weight of about 3 mg./cm.$^2$, and then dried. The visual brightness and peak efficiency of the emission from the settled screens are then measured in an evacuated demountable cathode ray tube. The change in brightness of the contaminated sample as compared to its control defines the contamination resistance of the phosphor. The smaller the change in visual and peak brightness, the greater the contamination resistance. For the phosphor used in prior color kinescopes, (typically ZnS:Ag:Na, which is synthesized with a flux containing only sodium salts and no alkaline earth metal salts), the average shift in visual brightness is from 100 to 333, or a difference of 233 and the average shift in peak efficiency is from 100 to 54 or a difference of 46. The phosphor whose synthesis with magnesium chloride flux is described above exhibits an average shift in visual brightness from 100 to 241 or a difference of 141 and an average shift in peak efficiency of 100 to 72 or a difference of 28. Production evaluation of the described phosphor shows that the degree of contamination resistance of the phosphor made with magnesium chloride flux is such that practically no tubes are rejected due to contamination of the blue-emitting elements; whereas with the previous blue-emitting phosphor, a substantial number of tubes were rejected due to copper contamination of the blue-emitting elements.

Another feature of the claimed device is that the blue-emitting phosphor elements increase in brightness more linearly with increases in levels of excitation in the normal operating range. This results in a more faithful rendition of color images at all levels of picture brightness. The following test was devised to provide a comparative measure of this characteristic. A quantity of phosphor is formed into a test sample about ¾ inch in diameter and about ⅜₄ inch thick. The sample is placed in a demountable cathode ray tube and the tube evacuated. The sample is excited with an electron beam which traces a television raster of about ½ inch by ½ inch on the sample using an acceleration voltage of about 8 kilovolts and about 1 microampere of beam current. The light emitted by the sample is passed through a narrow band filter (such as a monochrometer) which passes light in the range of about 4400±20 A. and the brightness of the light output in this range is measured. In a typical measurement, first, the brightness is measured with the beam defocussed to provide a circular spot on the sample about 90 mils in diameter. Then, the brightness is measured with the beam focussed to provide a circular spot on the sample about 30 mils in diameter. The relative merit of the phosphor as to change in brightness is the measured brightness with a focussed beam ( high current density condition) divided by the measured brightness with a defocussed beam (low current density condition) times 100. An ideal blue-emitting phosphor would give a value of 100. Blue emitting phosphors synthesized with a flux containing only magnesium cations and free of monovalent cations have values of about 97. Similar results are obtained when calcium or strontium or barium are substituted for magnesium. Similar blue-emitting phosphors synthesized with a flux containing principally sodium salts give values of about 93.

In prior color kinescopes wherein the three phosphors were all sulfides, the described shift in emission color with increased excitation was not so pronounced because all three phosphors behaved in a similar manner. However, in more recent commercial color kinescopes, wherein the red-emitting phosphor is a europium-activated phosphor, the effect is more pronounced. The europium-activated red-emitting phosphors behave in a manner somewhat different from the prior silver-activated blue-emitting and green-emitting phosphors. These europium-activated phosphors are line-emitters (not band-emitters) and have distinctly different hosts and activators. The emission properties of the blue-emitting phosphors used in the claimed devices have the advantage over the blue-emitting phosphors previously used of being better matched to the emission properties of the europium-activated red-emitting phosphors described above.

What is claimed is:

1. A cathode ray tube including an evacuated envelope, a luminescent screen within said envelope, said screen being comprised of an array of red-emitting, green-emitting and blue emitting phosphor elements arranged in a regular repetitive order, and electron beam producing means within said envelope for selectively exciting each of said phosphor elements; the blue-emitting elements consisting essentially of a phosphor whose composition is represented by the molar formula:

$$ZnS:Ag(x):M(y)$$

wherein:

M is one only of Mg, Ca, Sr, and Ba
$x$ is in the range of 0.030 to 0.060 weight percent
$y$ is in the range of 0.02 to 2.00 weight percent, said blue-emitting phosphor being substantially free of monovalent cations other than silver.

2. The cathode ray tube defined in claim 1 wherein M is Mg.

3. The cathode ray tube defined in claim 2 wherein said green-emitting phosphor elements consist essentially of zinc cadmium sulfide with silver activator wherein the weight ratio of zinc sulfide/cadmium sulfide is in the range of about 55/44 to 70/30; and said red-emitting elements consist essentially of zinc cadmium sulfide with silver activator, wherein the weight ratio of zinc sulfide/cadmium sulfide is in the range of about 15/85 to 20/80.

4. The cathode ray tube defined in claim 2 wherein the green-emitting elements consist essentially of zinc cadmium sulfide with silver activator wherein the weight ratio of zinc sulfide/cadmium sulfide is in the range of about 55/45 to 70/30; and said red-emitting elements consist essentially of yttrium orthovanadate with europium activator, wherein the europium content is present in the proportion of 2.5 to 5.5 mol percent of the phosphor.

5. The cathode ray tube defined in claim 2 wherein the green-emitting elements consist essentially of zinc-cadmium sulfide with silver activator wherein the weight ratio of zinc sulfide/cadmium sulfide is in the range of about 55/45 to 70/30 and said red-emitting elements consist essentially of yttrium oxysulfide with europium activator wherein the europium is present in the proportion of 2.5 to 5.5 mol percent of the phosphor.

References Cited

UNITED STATES PATENTS

| | | |
|---|---|---|
| 2,956,028 | 10/1960 | Davis. |
| 2,966,464 | 12/1960 | Ropp. |
| 2,991,383 | 7/1961 | Hardy _____ 313—92 |
| 2,996,402 | 8/1961 | Feldman _____ 313—92 X |
| 3,052,638 | 9/1962 | Wayrynen. |
| 3,243,625 | 3/1966 | Levine et al. _____ 313—92 |

FOREIGN PATENTS 354,500  11/1937  Italy.

ROBERT SEGAL, Primary Examiner

U.S. Cl. X.R.

252—301.6